(12) United States Patent
Smyros et al.

(10) Patent No.: US 9,773,056 B1
(45) Date of Patent: Sep. 26, 2017

(54) OBJECT LOCATION AND PROCESSING

(75) Inventors: Athena Ann Smyros, Richardson, TX (US); Constantine John Smyros, Richardson, TX (US)

(73) Assignee: INTELLIGENT LANGUAGE, LLC, Richardson, TX (US)

(*) Notice: Subject to any disclaimer, the term of this patent is extended or adjusted under 35 U.S.C. 154(b) by 0 days.

(21) Appl. No.: 13/070,465

(22) Filed: Mar. 23, 2011

Related U.S. Application Data

(60) Provisional application No. 61/340,817, filed on Mar. 23, 2010.

(51) Int. Cl.
*G06F 17/30* (2006.01)

(52) U.S. Cl.
CPC .............. *G06F 17/30666* (2013.01)

(58) Field of Classification Search
None
See application file for complete search history.

(56) References Cited

U.S. PATENT DOCUMENTS

| | | | |
|---|---|---|---|
| 6,182,029 B1* | 1/2001 | Friedman | 704/9 |
| 6,327,566 B1 | 12/2001 | Vanbuskirk et al. | |
| 7,739,133 B1* | 6/2010 | Hail et al. | 705/4 |
| 2003/0217052 A1* | 11/2003 | Rubenczyk et al. | 707/3 |
| 2004/0221235 A1* | 11/2004 | Marchisio et al. | 715/534 |
| 2006/0025987 A1* | 2/2006 | Baisley et al. | 704/4 |
| 2007/0288435 A1* | 12/2007 | Miki | G06F 17/3025 |
| 2009/0106015 A1* | 4/2009 | Li et al. | 704/2 |
| 2011/0055241 A1* | 3/2011 | Lewis | 707/766 |
| 2011/0144996 A1* | 6/2011 | Ma | G06F 17/2765 704/251 |

* cited by examiner

*Primary Examiner* — Bai D. Vu
(74) *Attorney, Agent, or Firm* — Slater Matsil LLP

(57) ABSTRACT

Embodiments described herein locate objects in input. Embodiments first parse the input into a form that can be used to perform the analysis required to construct a set of one or more objects. Embodiments then form, when possible, object character strings by using the grammatical values of the underlying terms. The set of object character strings can be used in a variety of textual analysis procedures, such as search, comparisons, and other combinatorial analysis that requires the use of objects in performing tasks related to an information repository of documents, files, messages, etc.

20 Claims, 5 Drawing Sheets

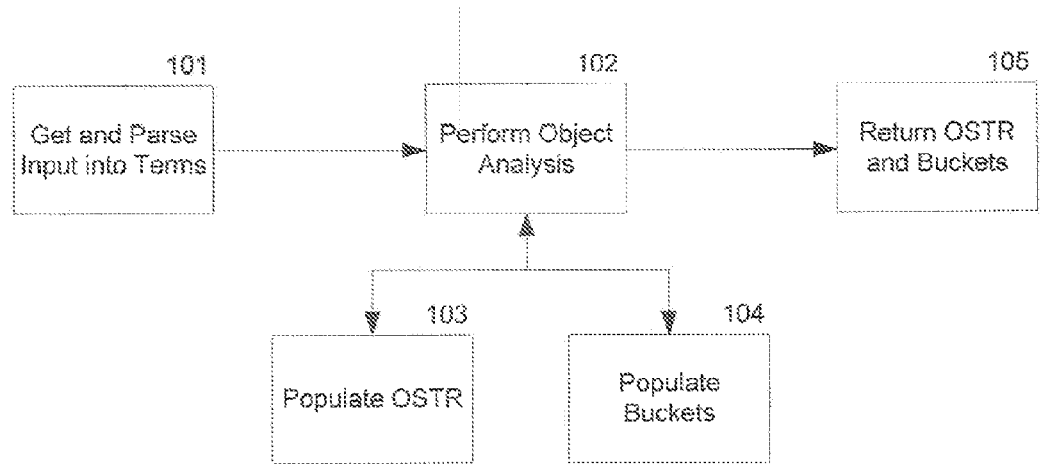
FIG. 1 Object Location

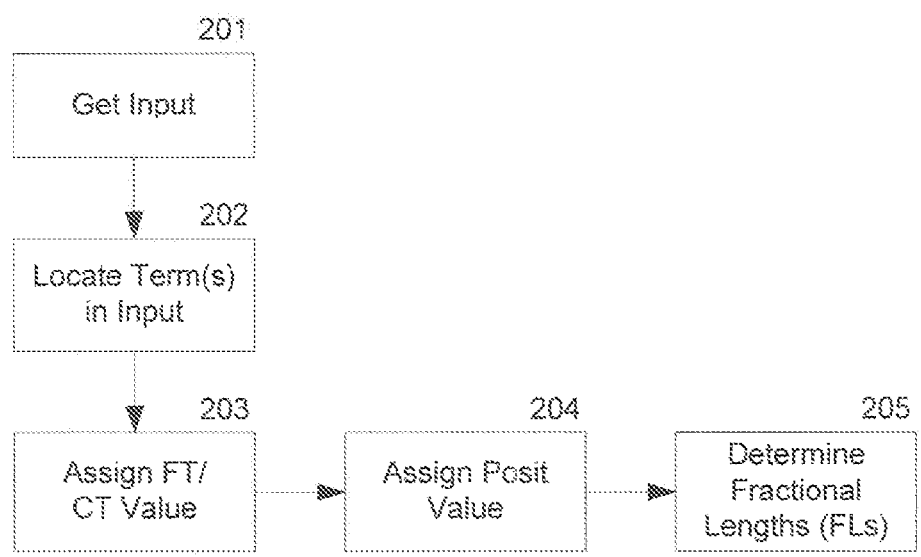
FIG. 2 Initial Parsing Method

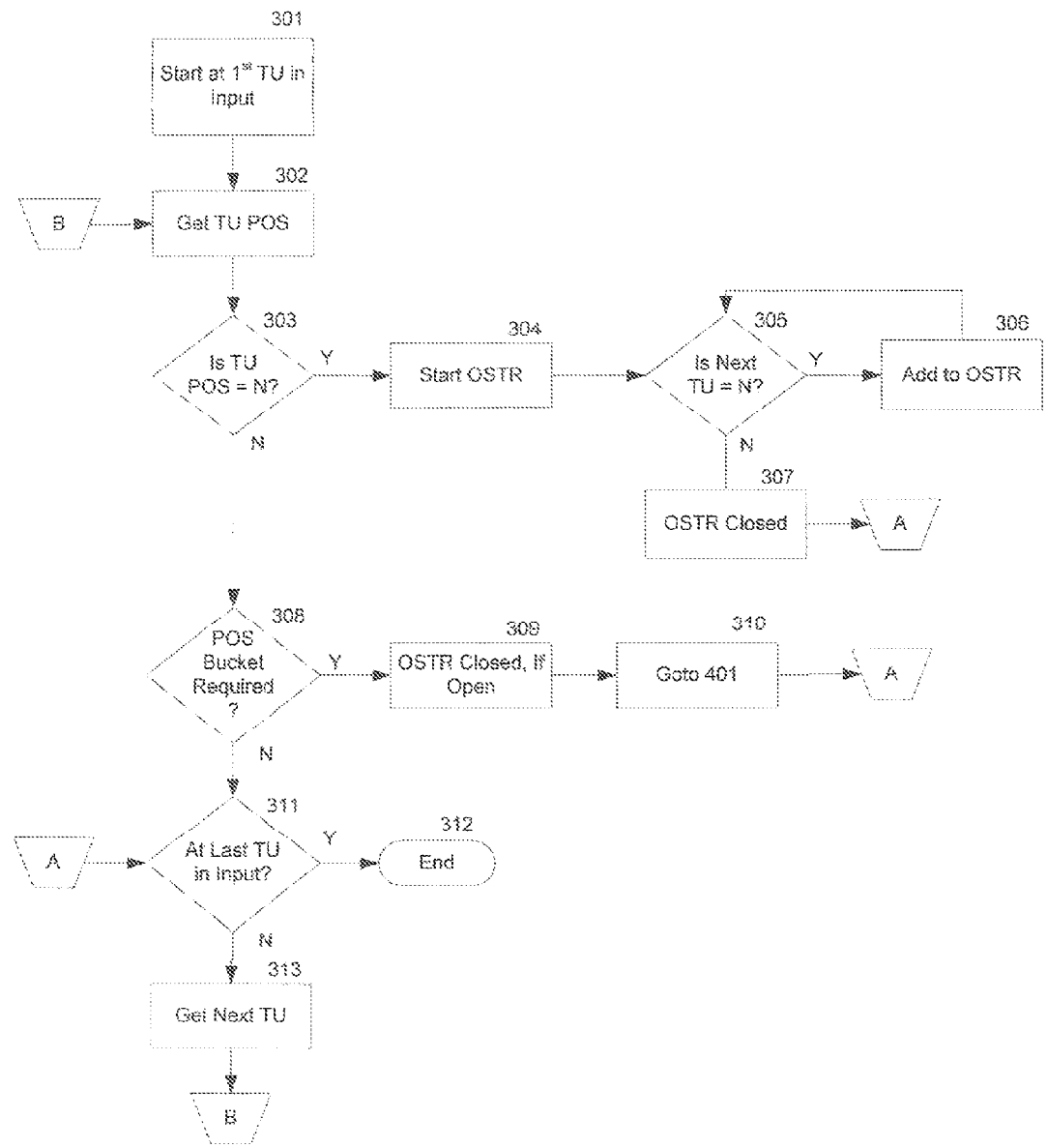
FIG. 3 Object Identification Process

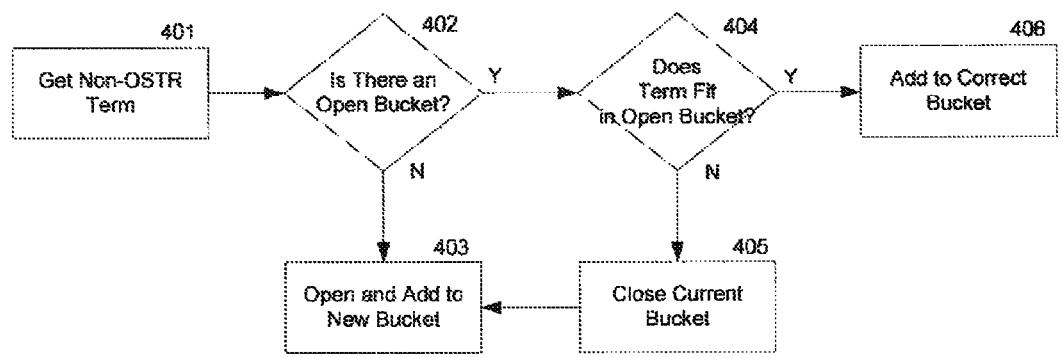
FIG. 4 Bucket Formation Process

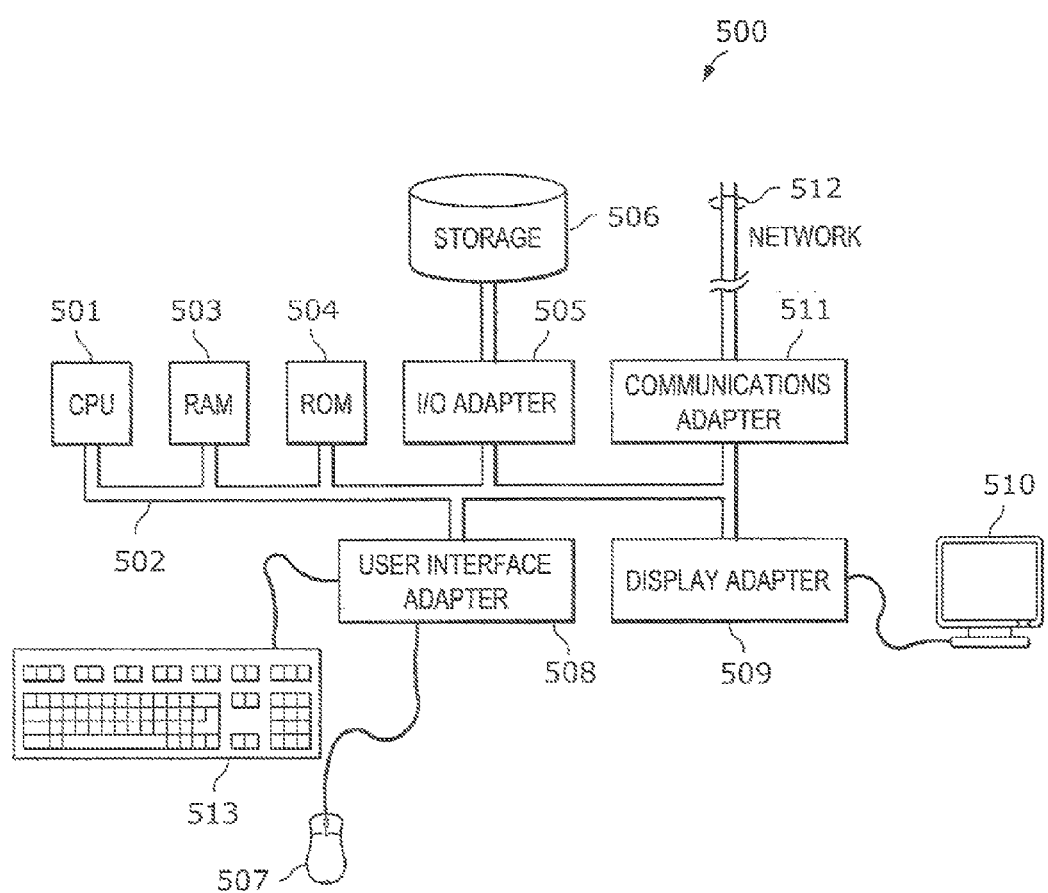
FIG. 5 Computer System

OBJECT LOCATION AND PROCESSING

RELATED APPLICATIONS

This application claims priority from Provisional Application No. 61/340,817, "OBJECT LOCATION", filed Mar. 23, 2010, the disclosure of which is hereby incorporated herein by reference.

TECHNICAL FIELD

The present invention relates in general to information repository management and in particular to identifying objects for different types of information retrieval and processing.

BACKGROUND

In information retrieval technology, there is a need to identify objects that form the basis for several processes. In current state-of-the-art technology, the object is supplied in some manner, indicating that a structure must exist for the object to be located within a larger entry or document. This does not work for unstructured data, or data that cannot be assumed to have any artificial structure, such as metatags, placed on it. Therefore, object location must be performed on such inputs that can take a character string and break it down into a set of objects.

SUMMARY OF THE INVENTION

The present invention is directed in general to a system and method which provides objects from an information repository of documents, files, messages, or from direct user input as through an interface. Embodiments first parse the input into a form that can be used to perform the analysis required to construct a set of one or more objects. Embodiments then form, when possible, object character strings by using the grammatical values of the underlying terms. The set of object character strings can be used in a variety of textual analysis procedures, such as search, comparisons, and other combinatorial analysis that requires the use of objects in performing tasks.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which:

FIG. 1 illustrates an example of an object location system that is usable with the embodiments described herein;

FIG. 2 illustrates an initial parsing process according to embodiments described herein;

FIG. 3 illustrates an example of an object identification process according to embodiments described herein;

FIG. 4 illustrates an example of a bucket formation process according to embodiments described herein; and FIG. 5 illustrates a block diagram of an example of a computer system which is adapted to use the embodiments described herein.

DETAILED DESCRIPTION OF THE INVENTION

Object location can be used in various applications, such as for information retrieval, analysis, searching, and any application that requires information to be analyzed. FIG. 1 illustrates the components that minimally comprise an object location system; other ancillary components can be added to this system, and the system may be integrated into various other systems. Interface 101 may receive input from various sources using various methods, such as input entered in by a user, a request from another system, or data generated within the current system that contains text that needs to be analyzed. Once this input is obtained, the interface 101 may be put into an appropriate form that separates terms from one another in the string (i.e., parsed), such as in English, where a word is generally distinguished from another by the use of a space. The output of interface 101 is an array or matrix of terms in the order of appearance that they occurred in the original string. Note that the parsing function may be performed by a separate module, such as a parser.

In any event, once the term matrix is built, then the Object Analysis by analyzer 102 begins. An object is considered to be the part of speech (POS) in a given language that denotes them. For instance, in English, the noun POS denotes an object. The length of the object is determined by analysis; there is no limitation on the number of terms that denote an object. This length is referred to as an object string (OSTR). The matrix of terms may contain more than just objects, so the level of analysis may vary based on input characteristics as well as the desired output. In some implementations, only the determination of an object is required; the rest of the input that is not an object is not used in further analysis. In other implementations, the entire input needs to be characterized. Still, it is possible that only the determination of non-object terms is required. Since the order in which an object and non-object parts of the input are considered to be largely random, the path from 102 may be looped.

Depending on the level of analysis required by a specific implementation, either OSTR Population and/or Bucket Population is performed by their respective populators 103 and 104. An OSTR may have modifiers such as adjectives that along with it that fully describe the instance of a particular object. One method for OSTR population is a lookup of the terms that comprise the set of OSTR members, such as the noun POS in English. Other methods may be used that are more expansive than a simple term lookup, such as one that handles compound nouns or acronyms that represent objects. These would be added to an adjective bucket or jBucket. The jBucket can contain any adjective that can modify an OSTR POS. Other POS may also be used to form buckets when they do not modify nouns. For instance, a verb bucket (vBucket) can be formed when the POS is equal to a verb, as it is in English. However, there are several times when verbs may be equal to another POS, such as the verbal noun condition in English, which should be resolved before the vBucket membership can be determined.

The OSTR and/or the buckets, once populated, are the basis for the Output that is provided by the interface 105 back to the user or system. The output can be stored based on the OSTR or bucket membership for each term in the matrix. Any manner of storing the strings that belong to each bucket could be used, since the strings can easily be assigned to a larger structure. This is because the output format may be conditioned based on the user or system requirements which can vary considerably. For instance, it is possible to simply number the terms that comprise the output and assign an integer to indicate its placement, and then give an indication of to which bucket it belongs. The buckets may also be assigned an integer value. In other implementations, it may be necessary to return the buckets in an agreed-upon order.

The initial parsing as indicated in FIG. 2, which is an expanded version of interface 101, is designed to be an efficient manner of using a document's character strings and processing them into identifiable lengths. Get Input 201 handles an input of any size up to hardware limitations. Any textual input based on a language is usable; in one embodiment, that language is English. The input is processed in 202 so that each term in the input is located. A term is any collection of characters in a string that form a recognizable element of a language. Such terms have a delimiter that separate one term from another. In the one embodiment, English, that delimiter is a space. Therefore, the location of term(s) in input 202 parses the input to locate each term and place it in a matrix in order of appearance in the input.

For each term (TU) that is located, a functional term (FT) or a content term (CT) designation is assigned, as in 203. This is based on maintaining a list of functional terms in a language. In English, the functional terms are comprised of the POS that correspond generally to articles, prepositions, pronouns, and conjunctions. Note that depending on the parsing process, punctuation may be equal to a term in length. Punctuation may be used in bucket determination processes but is not generally considered to be a part of either the OSTR or a bucket. Any term that is not an FT or punctuation is then considered a CT. Once a term has been assigned an FT or CT value, a position (posit) value 204, or the order of appearance for each term in the matrix should be assigned, if not directly indexable from the data structure used to build the matrix.

For more information on indexing, see U.S. application Ser. No. 12/192,794, entitled "SYSTEMS AND METHODS FOR INDEXING INFORMATION FOR A SEARCH ENGINE", filed 15 Aug. 2008, published as 2010/0042602 on 18 Feb. 2010, the disclosure of which is hereby incorporated herein by reference in its entirety.

Lastly, the fractional length (FL) 205 may be determined. This is optional as some implementations may not require this step, especially if the input is short or the input is restricted in some way by POS. When used, the FL calculation is based on the FT or CT value of each term in the input. The purpose of the FL is to form the basis for the remainder of processing by the system for the purpose of object identification. The first FL always starts with the first term, posit 1, regardless of FT or CT value. Then, the system should locate the next FT, if it exists. If there is no FT at this point and the end of the input has been reached, then there is only one FL in the input. Otherwise, the occurrence of the next FT indicates that a new FL has been started. The first FL's starting posit would be equal to Posit 1 and the endpoint would be the term directly before the FT. For example, assume that the next FT occurs at Posit 5. Then the first FL, or FL1 would be equal in length to 4, since Posit 5 is the start of a new FL. The last FL in the input always ends at the last TU in the input, regardless of FT or CT assignment.

Once all FLs have been located for an input, if desired, then the Object Identification process of FIG. 3 can begin. Depending on implementation, this may be run only to find OSTR, and therefore no other buckets are formed. If that is the case, then there is no need to coordinate processing of any other bucket. If other buckets are required by an implementation, or if a full analysis of the input is required, then there are points in the process that require that each bucket is analyzed. Note that buckets may only be formed, and the OSTR is not used. Bucket membership is based on POS, such as a verb would belong to the vBucket, the adverb to the dBucket, for instance, and so on for all POS that is required either by the implementation or the language. For example, in English, the POS set would be comprised of noun, verb, adverb, adjective, pronoun, preposition, conjunction, article, and interjection.

Before processing can start, a filter may be constructed that removes the terms that do not comprise an object, such as verbs in English, if the OSTR is the only desired output and the input is not already filtered in this manner. Any part of speech that behaves in this fashion, and that is assigned to a TU, should be filtered. The list of TUs that need to be filtered should be maintained in a searchable form so that lookups based on TU are possible. For instance, in English, the preferred list would include verbs such as "find", "get", "send", etc. The object is identified and maintained by the system by using an object string (OSTR), that indicates the starting and ending posit of the terms within its boundaries. The OSTR index is incremented based on the order of appearance. Note that if a vBucket is required, then this filter should not be used.

First TU in Input 301 starts the process. Note that the input may be considered either the entire input or may be the set of the optional FLs. Each FL can be run independently if required by an implementation by running the entire object location process as many times as there are FLs. All TUs should have a POS assigned to them as well as a CT or FT designation. This in many implementations should be assigned before this process starts and is considered more efficient; however, it is possible for this to occur on a TU by TU basis. Regardless, TU POS 302 is obtained. The TU POS is checked to see if it is a noun 303. Depending on random factors, the POS for a given TU may have more than one POS. If this is true, then the answer to this can be set to no, and allow bucket membership rules to determine where the TU fits in a bucket. If it is, then an OSTR is opened and this TU is put into it 304. For example, using the example: "jackets that are striped", the TU "jackets" is found to be only a noun in this implementation. As a result, "jackets" is put into an OSTR. A loop is created to check to see if any more nouns exist 305 that can be added to the open OSTR 306. If at any point a non-OSTR POS is discovered, then Close OSTR 307 is performed. Note that the closing of an OSTR means that only those TUs that were found in series are added to an OSTR. If there is more than one OSTR found in an input, then these start a new OSTR. These may be tracked by, for instance, using a simple integer in order to preserve the order of OSTRs within the input. If the TU POS is not equal to a noun, and based on implementation if more object analysis is required, then bucket required 308 is true. If no buckets are required, then test 311 is done. If test 311 is true, then the process terminates 312. If there are more TUs, then the next TU 313 should be used and process starts over again with a new TU as indicated by SYMBOL B.

When a bucket needs to be created, then if an OSTR is open at the time, Close OSTR 309 is performed. In the above example, "that" is not considered in the implementation to be a noun, and therefore the OSTR is closed and only contains "jackets". Afterwards, 310 directs the processing to FIG. 4, Get Non-OSTR 401. The bucket determination process begins. This process is similar to the OSTR since the buckets are formed based on the input order of the TUs. This means that a new bucket should be created and then tracked, if required by the implementation, by some method such as a simple integer assignment to each bucket. Note that at this point, the status of the buckets are not required to be kept. Therefore, Open Bucket Test 402 is done to see if there is an open bucket. In the above example, there would be no open bucket. If there is no open bucket, then a new bucket is be opened 403 based on the POS of that TU and which bucket it maps into. In the above example, the TU "that" would map to a pronoun bucket (pBucket) in a sample implementation. If there is an open bucket, then the current TU should be checked to see if it meets the requirements of the open bucket's membership 404. If it does, then 406 add TU to bucket is performed. If not, then Close Bucket 405 is performed and a new bucket 403 is opened.

The bucket formation is generally comprised of two basic rules: POS and output usage. In some cases, the POS is the only requirement for a bucket. For instance, in English, the membership into the vBucket requires that the verb patterns known in English are used to distinguish the verb usage from the verbal noun or adjectival usage. The only POS that can join this bucket are the verbs. However, based on output implementation requirements, qualifiers of verbs, such as adverbs in English, may also be considered to be useful as part of the same bucket. While this formation may be done with POS buckets and OSTRs that are tracked based on an overall ordering, such as a simple list, after object location is complete, it may also be done by creating a bucket that contains the membership rules that determine which adverbs modify verbs to be used as well. Buckets are generally formed based on input order and may be tracked and therefore grouped in some other order other than the input order either during object location procedures or after object location has completed.

Since an input may contain TUs that may or may not be used for information retrieval, searching, or other information analysis processes, there needs to be flexibility in object analysis to support this. For instance, many searching functions do not require FTs as part of the results. Therefore, the FTs may not be explicitly used in the results. Then, no bucket would be created for them. However, in some cases the FTs are necessary. These are then added to an appropriate bucket based on the implementation requirements. The formation of a bucket then is generally based on POS. However, there may be a need to specifically identify an object based on its modifiers, including FTs. As an example, a modifier Bucket (mBucket) can be set up that can allow more than one POS to be a member of it, and can include both FTs and CTs. The order of appearance in the input is maintained. Other divisions of a bucket can be created based on implementation requirements, and these can be tracked internally to the bucket.

Once the bucket has been determined and the TU entered into the bucket, processing returns as shown in FIG. 3, symbol A. The next test is determine if the process is at the last TU in input 311. If so, then the object determination process terminates. If not, then the Next TU 312 is performed and the process loops back to Get TU POS 302 until the last TU in the input test 311 is found to be true. There is no limit on how many times the bucket process may be called and there is no limit on the number of TUs that comprise an input. Again, the bucket process and the OSTR processes are considered optional, as depending on the implementation requirements, the input may be scanned for one or the other or both. In the above example, the final bucket formation for an implementation that used both OSTR and POS buckets would be: "jackets"=OSTR, "that"=pronoun bucket, are=verb bucket, and "striped"=adjective bucket.

Once all the buckets and the OSTR have been formed, then any amount of analysis may be performed. For instance, each OSTR may be checked to find the last TU. The last TU in OSTR is often considered to be the most important from an analysis perspective, and is used in several topical-based analysis functions as well as searching and lookup functions. The other CTs that make up the OSTR may be considered modifiers of the last TU in the OSTR. Depending on the implementation, a system may correct for the object TUs length when a language supports multiple TUs to describe an entity. The system, also depending on implementation, may also have to account for variations in spelling, such as "email" "electronic mail", and "e-mail". Other refinements that might affect the OSTR TU length are possible as well, based on the language being used.

Once all OSTRs and buckets have been formed for an input, other processes may be performed on them, such as search, comparisons, and other such combinatorial analysis. Any relation the input has, as to a repository for example, may be extended to the OSTRs and/or buckets that exist between the two entities. For instance, in a search operation, the OSTR(s) found in the input may be compared to a set of documents that comprise a repository. The comparison may be based on both the input and the repository having OSTR analysis performed on them. The repository may be processed either at a previous point or may be processed at the time of the request, as in one mode of the invention. There are several relations that are possible with comparing the input OSTRs to the repository member OSTRs: an exact match, a simple keyword match, or a grammatical locator. An exact match would look for the OSTRs in the input to appear exactly, using either or both partitions of the OSTR to equate to the exact match. The OSTRs and/or buckets of the input may also be compared as keywords, as in current state-of-the-art, using the OSTR as a basis for determining the keywords that would be used for processing. This generally would only include the CT-based buckets, or buckets that contain CTs as their members. For instance, a grammatical locator might indicate that each OSTR and/or bucket in the input reflects the grammatical form of the corresponding OSTR and/or bucket found in the repository for a comparison to be true.

In some information analysis processes, it may be necessary to compare OSTRs and/or buckets within an input. In addition, depending on the processing required, these buckets along with the corresponding OSTR may be put together to create a new structure, called the OSTR_Mod, that can form the basis for any information analysis. For example, using a grammatical locator, it may be necessary to for an implementation look at each OSTR or OSTR_Mod within an FL or adjacent FLs to determine if there is a relationship between them. Depending on the OSTR or OSTR_Mod relation to the FL, OSTRs within the FL are considered to have a set of processes related to them to determine the relationship value. There may be one or more such values depending on implementation. The OSTRs from two adjacent FLs also have a set of processes related to them to determine its relationship value. Again, such relationship values may be equal to the OSTRs within the FL or different depending on the needs to the analysis that requires object identification. The number of adjacent FLs may constrained based on the language being used as well as the implementation. This means that for some grammatical locator methods as illustrated in the paragraph above may require that such information is maintained and processed, and this is provided by the OSTR partitions.

Some information processing may require OSTRs and/or buckets to form new relations. For instance, it is possible to locate multiple OSTRs that are equivalent based on the implementation requirements to form new information about a document.

For more information on indexing, see U.S. application Ser. No. 12/192,846, entitled "SYSTEMS AND METHODS FOR TOPICAL SEARCHING", filed 15 Aug. 2008, published as 2010/0042589 on 18 Feb. 2010, the disclosure of which is hereby incorporated herein by reference in its entirety. For more information on object-based topical analyzing (fetch), see U.S. application Ser. No. 13/027,256, entitled "GRAMMER TOOLS", filed 14 Feb. 2011, the disclosure of which is hereby incorporated herein by reference in its entirety.

In topical searching analysis for example, it may be beneficial to identify parts of a document that contain the same OSTR and corresponding bucket(s). Such correspondence is based on the location of the bucket in appearance order to the location of the OSTR. Some buckets are formed, depending on the rules, to include terms that modify a particular OSTR, such as a modifier bucket (mBucket). The rules may be stated so that any modification pattern known in the language can be used. The mBucket and OSTR correspondence, for instance, can be determined by the appearance order that they occurred in the input. This correspondence may involve a single mBucket or, depending on the position of the OSTR, may include several mBuckets.

In addition, such analysis may also consider the object TU of the OSTR or any such bucket related to the OSTR, as well as the OSTR_Mod, to form a relation. Also, any database-type function may be used to create new relations, such as unions, selections, projections, and other such techniques based on the OSTR and corresponding bucket(s), if any, value as an input to such functions. The OSTR_Mod can be used in the same fashion. Also, the OSTR and corresponding bucket(s), if any, as well as the OSTR_Mod may be used to compare an unstructured document to a structured document by using it as part of a query to a database to get information. For instance, the OSTR value may be used to form part or all of a where clause to get a specific set of values from a database.

Depending on the scope of the implementation, the available OSTRs or OSTR_Mods from an input such as a repository may be stored for future analysis. For instance, it may be useful to have a list of OSTRs or OSTR_Mod for a specific web site so that mobile users looking for data can have fields filled-in for them. This may also be used a variety of ways, such as populating drop-down menu lists and other such form-based controls. Such information may also be useful in search engine optimization and advertising or marketing functions, where the need to ascertain what terms are be used to navigate to and within the site, as well as other information about what is being entered by the user compared to how such things are described within the text. The OSTR_Mod and OSTR can be used in a plethora of analysis functions to determine if there is a need to restructure or change the emphasis of the text as presented or if additional emphasis on other objects is required. Search and long tail information would be easy to collect since the OSTR_Mod would comprise the full expression of an object at each instance of expression within an input such as a web page. This is independent of how the information is accessed by the user: through a search engine, a lookup table, a form control, etc.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

FIG. 5 illustrates computer system 500 adapted to use the present invention. Central processing unit (CPU) 501 is coupled to system bus 502. The CPU 501 may be any general purpose CPU, such as an Intel Pentium processor. However, the present invention is not restricted by the architecture of CPU 501 as long as CPU 501 supports the operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller 505, communications adapter 511, user interface 508, and display 509. The I/O adapter card 505 connects to storage devices 506, such as one or more of flash memory, a hard drive, a CD drive, a floppy disk drive, a tape drive, to the computer system. Communications 511 is adapted to couple the computer system 500 to a network 512, which may be one or more of a telephone network, a local (LAN) and/or a wide-area (WAN) network, an Ethernet network, and/or the Internet network. User interface 508 couples user input devices, such as keyboard 513, pointing device 507, to the computer system 500. The display card 509 is driven by CPU 501 to control the display on display device 510.

The invention claimed is:

1. A computer program product having a non-transitory computer-readable medium having computer program logic recorded thereon for locating at least one object in a text input, the computer program product comprising:
   means for parsing the text input into parsed terms, wherein the text input is a request to search for information in a repository, wherein the means for parsing the text input further comprises means for determining a fractional length, the fractional length indicating a number of term units from a first term unit to a next functional term unit;
   means for analyzing the parsed terms to locate an object term and a plurality of non-object terms, wherein the object term is a noun and each non-object term is one of a verb, adverb, adjective, pronoun, preposition, conjunction, article, and interjection, wherein at least one object term is placed into an object string and at least one non-object term is placed into one of a plurality of non-object buckets; and
   means for providing the object string and the plurality of non-object buckets to a search engine, wherein the search engine compares the object string and the non-object buckets with information in the repository.

2. The computer program product of claim 1, wherein the means for parsing the text input comprises:
   means for receiving input;
   means for locating terms in the text input; and
   means for assigning a designation to each term.

3. The computer program product of claim 2, wherein the designation for each term is one of functional or content.

4. The computer program product of claim 3, wherein a functional term is one of an article, a preposition, a pronoun, and a conjunction and a content term is one of a noun, an adjective, an adverb, and a verb.

5. The computer program product of claim 1, wherein each term is separated from another term by a delimiter.

6. The computer program product of claim 5, wherein the delimiter is a space.

7. The computer program product of claim 1, wherein the text input comprise a plurality of nouns, wherein the means for analyzing the parsed terms comprises:
   means for adding each noun to the object string.

8. The computer program product of claim 1, wherein the text input comprise a plurality of non-nouns, wherein the means for analyzing the parsed terms comprises:
   means for adding each non-noun to one of the plurality of non-object buckets.

9. The computer program product of claim 1, wherein the parsed terms comprises a plurality of non-nouns of at least two types, wherein the means for analyzing the parsed terms comprises:
   means for forming the plurality of non-object buckets with a respective non-object bucket for each non-noun type; and
   means for adding each non-noun to the respective non-object bucket.

10. The computer program product of claim 9, wherein each non-noun type is one of a verb, adverb, adjective, pronoun, preposition, conjunction, article, and interjection.

11. The computer program product of claim 1, wherein the means for providing comprises:
   means for providing the object string and the plurality of non-object buckets to a language analysis tool.

12. The computer program product of claim 1, wherein the search engine compares the object string and the plurality of non-object buckets with information in the repository according to one of an exact match, a simple keyword match, or a grammatical locator.

13. The computer program product of claim 1, wherein the input text includes a topic.

14. The computer program product of claim 1, wherein the parsed terms are in the form a numerical matrix.

15. The computer program product of claim 1, wherein the non-transitory computer-readable medium is associated with one of:
   a computer, a laptop computer, a personal computer, a personal data assistant, a camera, phone, a cell phone, a computer server, a music player, a game box, a smart phone, and a data storage device.

16. A computer program product having a non-transitory computer-readable medium having computer program logic recorded thereon for locating at least one object in a text input, the computer program product comprising:
   means for parsing the text input into parsed terms, wherein the text input is a request to search for information in a repository;
   means for analyzing the parsed terms to locate an object term and a plurality of non-object terms, wherein the object term is a noun and each non-object term is one of a verb, adverb, adjective, pronoun, preposition, conjunction, article, and interjection, wherein at least one object term is placed into an object string and at least one of non-object term is placed into one of a plurality of non-object buckets, wherein the text input comprise a plurality of non-nouns, wherein the parsed terms comprise a plurality of non-nouns of at least two types, wherein the means for analyzing the parsed terms comprises:
      means for forming the plurality of non-object buckets with a respective non-object bucket for each non-noun type; and
      means for adding each non-noun to the respective non-object bucket; and
   means for providing the object string and the plurality of non-object buckets to a search engine, wherein the search engine compares the object string and the non-object buckets with information in the repository.

17. The computer program product of claim 16, wherein the means for parsing the text input further comprises means for determining a fractional length, the fractional length indicating a number of term units from a first term unit to a next functional term unit.

18. The computer program product of claim 16, wherein the search engine compares the object string and the plurality of non-object buckets with information in the repository according to one of an exact match, a simple keyword match, or a grammatical locator.

19. The computer program product of claim 16, wherein the parsed terms are in the form a numerical matrix.

20. A computer program product having a non-transitory computer-readable medium having computer program logic recorded thereon for locating at least one object in a text input, the computer program product comprising:
   means for parsing the text input into parsed terms, wherein the text input is a request to search for information in a repository;
   means for analyzing the parsed terms to locate an object term and a plurality of non-object terms, wherein the object term is a noun and each non-object term is one of a verb, adverb, adjective, pronoun, preposition, conjunction, article, and interjection, wherein at least one object term is placed into an object string and at least one non-object term is placed into one of a plurality of non-object buckets; and
   means for providing the object string and the plurality of non-object buckets to a search engine, wherein the search engine compares the object string and the non-object buckets with information in the repository.

* * * * *